March 20, 1934.  J. S. REID  1,951,671

GLASS RUN CHANNEL STRUCTURE

Filed June 29, 1931

INVENTOR

JAMES S. REID

BY

ATTORNEYS

Patented Mar. 20, 1934

1,951,671

UNITED STATES PATENT OFFICE 1,951,671

GLASS RUN CHANNEL STRUCTURE

James S. Reid, Shaker Heights, Ohio, assignor to The Reid Products Company, Cleveland, Ohio, a corporation of Ohio Application June 29, 1931, Serial No. 547,571

3 Claims. (Cl. 296—44.5)

This invention relates to glass run channel structures adapted for use in connection with the windows of motor vehicles and the like.

The object of the invention is to provide an improved glass run channel structure wherein an outer U-shaped channel member of non-chattering, water proof, non-metallic material, such as specially treated heavy paper or the like, is provided at the free edges of its side flanges with finishing strips of stainless steel or the like, said strips being preferably of U form crimped upon said flange edges. Secured to the inner surface of said channel member side flanges, between the inner and outer edges thereof are glass-engaging lip pad strips, each being preferably of spring steel and comprising a vertically disposed portion secured to said side flanges and inwardly and upwardly bent glass-engaging portions. Said glass-engaging portions are provided with suitable cushioning material and a cushioning pad is also provided in the bottom of the channel member for engaging the edge of the glass inserted thereinto.

The invention is well set forth in the embodiment illustrated in the following description, drawing and claims.

Figure 1:
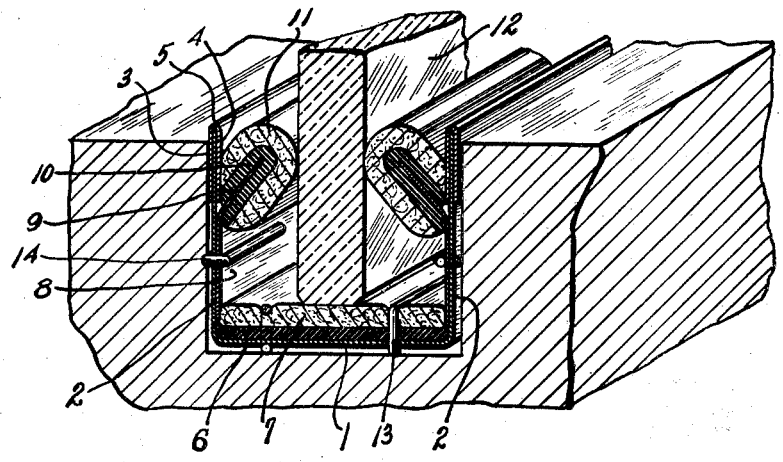
Figure 2:
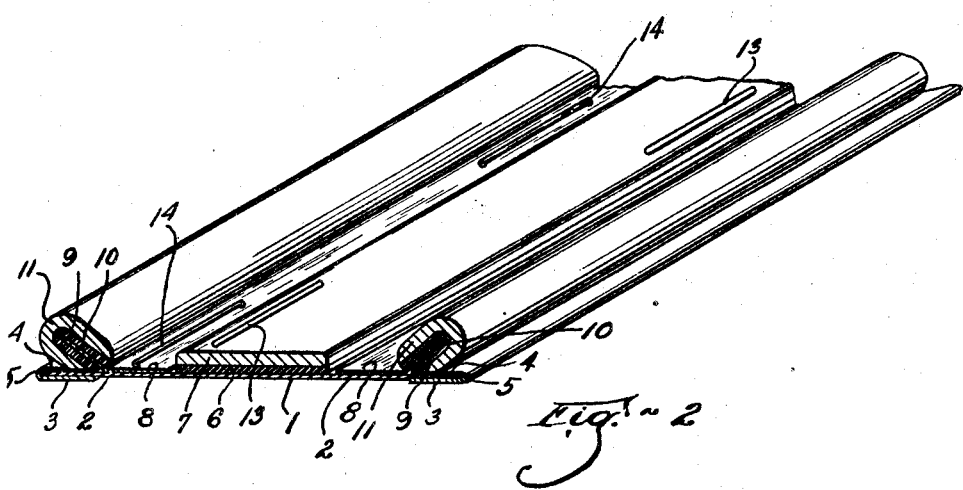

Referring to the drawing, Fig. 1 is a sectional view of a portion of the channel structure with a glass inserted therein, the view also showing the window groove in which the channel structure is located; and Fig. 2 shows the channel structure flattened out to more clearly illustrate the arrangement of its parts.

In the drawing, the outer channel member comprises a base 1 and side flanges 2, each of said side flanges being provided at its upper edge with a finishing strip of polished stainless steel or the like of folded formation, including the sides 3 and 4 connected by a top bend 5. These finishing strips straddle the upper edges of the side flanges and are pressed tightly into permanent engagement therewith. The bottom of the channel member is provided with a pad comprising a rubber strip 6 and an inner felt strip 7.

Secured to the inner side of each of the side flanges 2 is a lip pad strip comprising a flat vertically disposed securing portion 8 and an inclined glass-engaging portion 9 bent therefrom longitudinally of the strip and provided at its free end with an inner rubber covering 10 and an outer cover 11 of felt. The suitably covered portions 9 of the two felt lip pads engage the sides of the glass yieldingly but firmly hold it in place. The glass is illustrated as at 12. In manufacture, while the outer channel member may be made up of metal, I prefer to make it of paperlike fabric, such as treated paper, which may be rolled into channel form and which serves to adjust itself to the configuration of the window groove and to adhere thereto by reason of continued contact therewith. Such material is also noise-proof in the sense that it will not rattle. The bottom pad, including the parts 6 and 7, may be secured to the base 1 of the chamber member by suitable wire staples 13. In like manner, the flat portions 8 of the lip pad strips are secured to the side flanges 2 of the channel member by staples 14.

When one of these channel structures is placed in a window groove, the channel member, if of paper, adjusts itself to the channel groove walls and after a time adheres thereto by reason of the paper material of the channel member or the finish of the groove walls producing a bond. When the glass is inserted into the chamber member, the lip pads are parted and create a desirable yielding pressure upon the glass.

What I claim is:

1. A glass run channel structure, comprising a generally channel shaped, non-metallic member having a base and a pair of generally parallel side walls and adapted to be placed in a window frame groove, a pair of relatively narrow, metallic lip pad strips, one longitudinally secured to the inner surface of each of said side-walls, said strips extending from said side walls in converging relation and having their outer, glass-engaging edges terminating below or short of the outer edges of said side walls, and cushioning means for the glass-engaging outer edges of said lip pad strips.

2. A glass run channel structure, comprising a generally channel shaped, non-metallic member having a base and a pair of generally parallel side walls and adapted to be placed in a window frame groove, a pair of relatively narrow lip pad strips of spring metal, there being one longitudinally secured to the inner surface of each of said side-walls, said strips extending from said side walls in converging relation and having their outer, glass-engaging edges terminating below or short of the outer edges of said side walls, and cushioning means for the glass-engaging outer edges of said lip pad strips.

3. A glass run channel structure, comprising a generally channel shaped, non-metallic member having a base and a pair of generally parallel side walls and adapted to be placed in a window frame groove, a pair of relatively narrow, metallic lip pad strips, one longitudinally secured to the inner surface of each of said side-walls, said strips extending from said side walls in converging relation and having their outer, glass-engaging edges terminating below or short of the outer edges of said side walls, cushioning means for the glass-engaging outer edges of said lip pad strips, and metallic finishing beads for the outer edges of said side walls.

JAMES S. REID.